Figure 1:
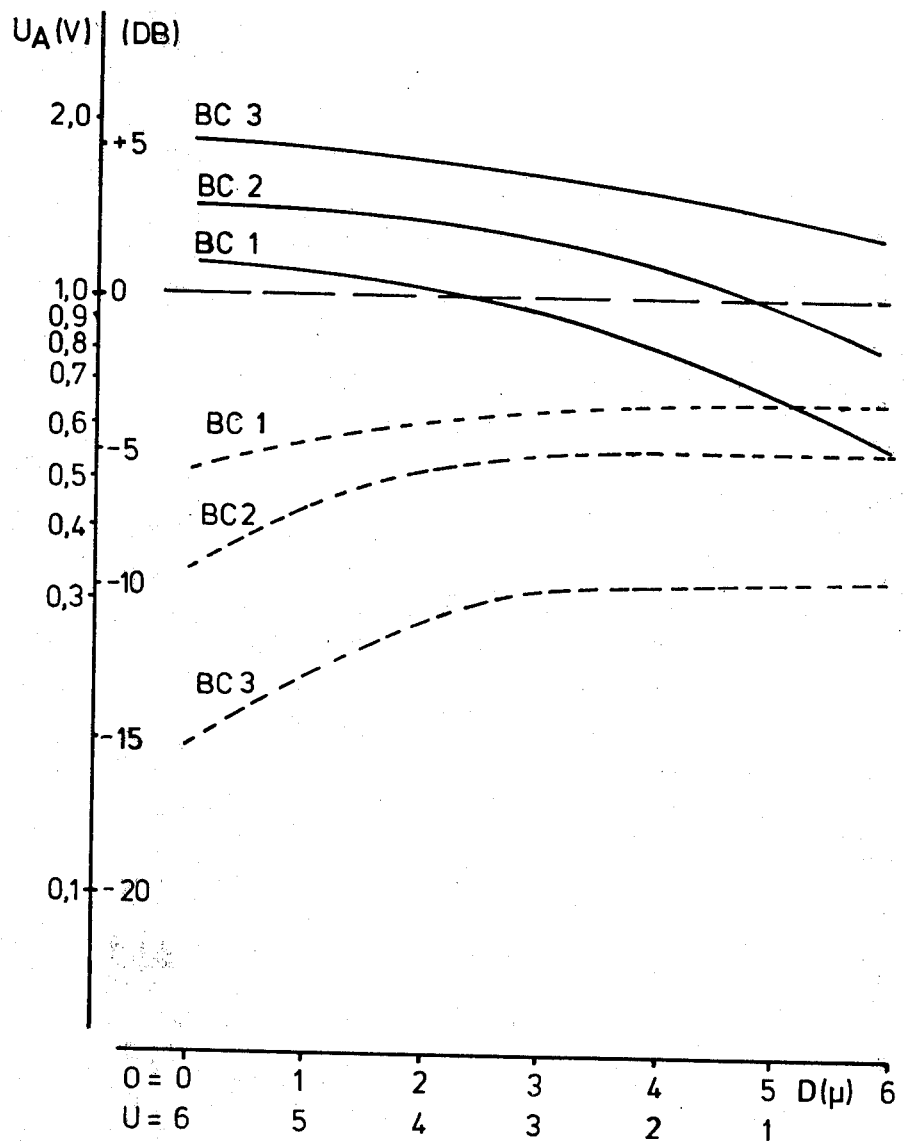

United States Patent [19]

Kober et al.

[11] 4,323,621
[45] Apr. 6, 1982

[54] MAGNETIC RECORDING MEDIUM

[75] Inventors: Heinrich Kober, Hohenschaeftlarn; Burkhard Nippe, Munich; Bernhard Seidel, Pullach all of Fed. Rep. of Germany

[73] Assignee: Agfa-Gevaert Aktiengesellschaft, Leverkusen, Fed. Rep. of Germany

[21] Appl. No.: 2,955

[22] Filed: Jan. 12, 1979

[30] Foreign Application Priority Data

Jan. 13, 1978 [DE] Fed. Rep. of Germany ....... 2801452

[51] Int. Cl.$^3$ ............................................... G11B 5/70
[52] U.S. Cl. ..................................... 428/216; 360/134; 427/131; 428/329; 428/694; 428/900
[58] Field of Search ............... 428/400, 539, 212, 216, 428/694, 695, 329; 252/62.58, 62.63, 62.61, 62.62; 148/105; 427/131; 360/134

[56] References Cited

U.S. PATENT DOCUMENTS

| | | | |
|---|---|---|---|
| 3,912,646 | 10/1975 | Leitner et al. | 252/62.58 |
| 3,928,709 | 12/1975 | Audran et al. | 252/62.63 |
| 4,061,824 | 12/1977 | Deffeyes et al. | 148/105 |
| 4,069,073 | 1/1978 | Tadohoro et al. | 148/105 |
| 4,075,384 | 2/1978 | Suzuki et al. | 427/131 |
| 4,091,158 | 5/1978 | kasuga et al. | 427/131 |
| 4,091,158 | 5/1978 | Kasuga et al. | 428/900 |
| 4,109,046 | 8/1978 | Hammon et al. | 428/900 |
| 4,155,748 | 5/1979 | Steck et al. | 148/105 |
| 4,165,232 | 8/1979 | Jaekh et al. | 148/105 |
| 4,200,678 | 4/1980 | Pister et al. | 428/900 |
| 4,210,940 | 7/1980 | Iwasaki et al. | 428/212 |
| 4,237,189 | 12/1980 | Deffeyes | 428/900 |
| 4,237,506 | 12/1980 | Manly | 428/900 |

FOREIGN PATENT DOCUMENTS

| | | |
|---|---|---|
| 2507975 | 4/1975 | Fed. Rep. of Germany ...... 427/131 |
| 2456960 | 6/1976 | Fed. Rep. of Germany ...... 427/131 |
| 2615961 | 10/1976 | Fed. Rep. of Germany ...... 427/131 |
| 2801416 | 7/1978 | Fed. Rep. of Germany ...... 427/131 |

Primary Examiner—Stanley S. Silverman
Attorney, Agent, or Firm—Connolly and Hutz

[57] ABSTRACT

A magnetic recording material, preferably for tape recorders which are designed for the iron oxide bias setting and for a playback equalization of 120 μs, consisting of a support and at least two layers containing magnetic pigments and binders and differing in coercivity and layer thickness, the uppermost layer containing as acicular, magnetic pigment thermally stabilized magnetite containing from 0.1 to 5% by weight of Cd, Pb, Ca, Mg, Zn, Al, Cr, W, P and/or B based on $Fe_3O_4$. The pigments have an average crystallite size of from 30 to 35 nm and a coercivity of from 28 to 36 KA/m. These double-layer tapes have a low bias level and a high dynamic range despite a playback equalization of 120 μs.

5 Claims, 2 Drawing Figures

MAGNETIC RECORDING MEDIUM

This invention relates to a magnetic recording material in which at least two layers containing binders and magnetic pigments are arranged one above the other on a flexible support layer.

Multilayer magnetic recording materials have been repeatedly described over recent years.

According to the first Patent Specifications, such as for example U.S. Pat. No. 2,643,130 or German Pat. No. 1,285,005, the reproduction of high frequencies was improved by using pigments of high coercivity in the outermost layer, whilst the coercivity in the lower layer is lower or, where several lower layers are present, decreases progressively downwards. According to German Auslegeschrift No. 1,279,089 the pigments in the lower layer are oriented parallel to the support, whereas the pigments in the upper layers are given a preferential direction substantially perpendicular to the support. According to German Auslegeschrift No. 2,208,792, the frequency response is improved by selecting the coercivity of the outer layer depending upon the layer thickness. In Winckel "Technik der Magnetspeicher", page 395, it is pointed out that, for a wavelength to layer thickness ratio of $\leq 2$, the effective layer thickness is independent of the layer thickness, i.e. at high frequencies the recording quality as a whole is determined by only one surface zone. German Offenlegungsschrift No. 2,434,940 describes a magnetic recording material having two layers of different coercivity and residual saturation flux density so that, even in the medium frequency range, they have a flat sensitivity curve independent of frequency. In order to achieve this object, $CrO_2$ and $\gamma$-$Fe_2O_3$ with corresponding electroacoustic properties are used in the upper layer and in the lower layer, respectively. In order to avoid any reduction in sensitivity in the case of recording and reproducing apparatus with standardised bias setting, particularly for $CrO_2$, even in the medium audio-frequency range, chromium dioxides having various specific surfaces are used. One factor common to all of the above mentioned types of tape is that their optimum properties can only be utilised if tape recorders with correspondingly adjusted settings for magnetic biassing and equalisation are available. Thus, the time constant for the magnetic flux of $CrO_2$ tapes amounts to only 70 $\mu$s, which means that the bias noise level is reduced by about 3 dB in relation to the iron oxide setting (120 $\mu$s). Double-layer tapes of the $CrO_2$/$Fe_2O_3$ type are equalised with both time constants on the reproducing side even though the logical equalisation would be 90 $\mu$s. Since in most tape recorders it is not possible to adjust the various bias points and equalizations the improved frequency responses of double-layer tapes cannot be fully utilised for recording and reproduction. German Offenlegungsschrift Nos. 2,615,961 and 2,664,794 describe multilayer tapes which are very similar to the so-called low-noise tape in regard to magnetic biassing and equalisation and may be used in tape recorders where no provision is made for adjusting magnetic biassing and equalisation. To this end, iron oxide pigments of different pore density and coercivity are used in the individual layers. The recording material has a linear frequency response and may be used for recording and reproduction over the entire frequency range. However, it is still difficult to obtain an improved volume range over the entire frequency range, but above all at lower frequencies, if compatibility with single-layer tapes is to remain intact whilst, at the same time, retaining the playback equalization of 120 $\mu$s stipulated for single-layer tapes.

Accordingly, an object of the invention is to provide a magnetic recording material in which at least two layers containing binders and magnetic pigments are arranged one above the other on a flexible support using iron oxides with differentiated coercivities in the upper and lower layers with, at the same time, a reduction in the bias noise-level, based on the reference level, at the play back equalisation of 120 $\mu$s and with substantial improvements in the electroacoustic parameters for bias compatibility with the majority of recorders.

The invention, therefore provides a magnetic recording material in which the uppermost layer contains, as acicular, magnetic pigment, a thermally stabilised magnetite containing from 0.1 to 5% by weight of Cd, Pb, Ca, Mg, Zn, Al, Cr, W, P (expressed as $P_2O_5$) and/or B (expressed as $B_2O_3$), based on $Fe_3O_4$, and has a mean crystallite size, as determined by X-ray photography, of from 30 to 35 nm and a coercivity of from 350 to 450 Oe.

A BRIEF DESCRIPTION OF DRAWINGS

FIG. 1 shows the dependence of the electroacoustic properties upon the relation of the respective layer thicknesses of the double-layer tape according to the invention for the three bias currents (BC1, BC2, BC3).

Figure 2:
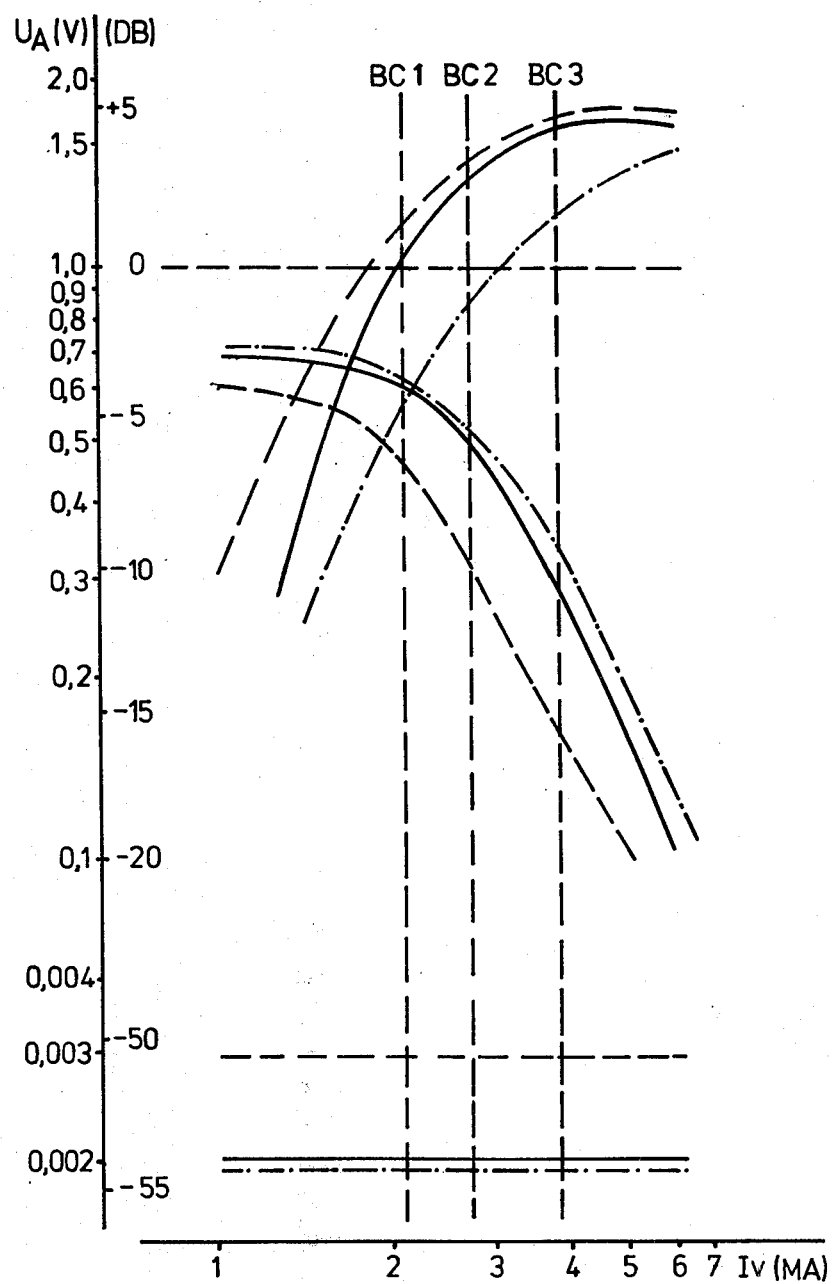

FIG. 2 compares the electroacoustic characteristics of a double layer tape according to the invention with the characteristics of single layer tapes.

The magnetite used in the uppermost layer is described in German Patent Application No. P 28 01 395.8. The new ferrimagnetic iron oxides of the magnetite type are preferably stabilised with zinc and phosphorus, zinc contents of from 0.3 to 3% by weight and phosphorus contents (expressed as $P_2O_5$) of from 0.3 to 3% by weight, based on $Fe_3O_4$, providing particularly good magnetic properties. The pigment is produced by a process in which a thermally stabilised $\alpha$-FeOOH having a length-to-width ratio of from 10:1 to 30:1 and a particle size of the order normally used as nuclei for the production of $\alpha$-FeOOH pigments (12 to 22 nm) is precipitated from an Fe(II)salt solution at a pH-value below 7, protected against sintering before dehydration, dehydrated, tempered and reduced into $Fe_3O_4$.

The $\alpha$-FeOOH is preferably heat-stabilised by doping with inorganic cations and/or anions, preferably during its production. In addition to the elements Cd, Pb, Ca, Mg, Al, Cr, W and B, P and Zn are particularly suitable for this purpose. Particularly effective stabilisation is obtained with a combination of P and Zn, quantities of from 0.3 to 3% by weight of P, expressed as $P_2O_5$, based on $Fe_3O_4$, and from 0.3 to 3% by weight of Zn, based on $Fe_3O_4$, being sufficient.

The stabilisers are added before or during precipitation of the $\alpha$-FeOOH in the quantities required for doping, in the form of their water-soluble salts.

However, doping may also be carried out by precipitation onto and, optionally, tempering on the precipitated and oxidised or re-reduced FeOOH or $Fe_3O_4$.

Doping is preferably combined with protection of the $\alpha$-FeOOH to prevent the individual crystals from sintering during conversion into magnetic oxide. To achieve this, a coating of hydroxides of chromium or aluminium or phosphates and/or borates and/or tungstates or even a combination of the above mentioned ions is precipitated in the actual α-FeOOH suspension directly after it has been produced and before it is subjected to dehydration. These protective coatings are produced in known manner, for example by the process according to Belgian Pat. No. 828,540.

The aftertreatment by coating the particles not only affords protection against sintering, but also results in additional doping during the following thermal operations.

The metal ions used for stabilisation are added to the Fe(II)salt solution in the form of water-soluble salts, preferably in the form of sulphates and/or chlorides.

Particularly good results are obtained by precipitating on phosphates, preferably iron phosphates. The phosphates are used in quantities which lead to a total P (expressed as $P_2O_5$) content in the FeOOH of from 0.3 to 3% by weight, based on $Fe_3O_4$, part of the phosphorus preferably being introduced during the production of the α-FeOOH. A further improvement in the properties may be obtained by carrying out this doping with phosphorus during production of the α-FeOOH in the simultaneous presence of zinc salts.

Production of the α-FeOOH by precipitation from acid Fe(II)salt solutions, followed by oxidation by injecting oxygen-containing gases into the precipitation suspension, is carried out in known manner in the same way as subsequent drying, dehydration and reduction into $Fe_3O_4$, for example in accordance with U.S. Pat. No. 3,931,025, with the difference that, after nuclei production, the process is terminated when a particle size of from 12 to 22 nm is reached. The precipitation and oxidation of the basic Fe(II)salt is preferably carried out from an $FeSO_4$-containing solution at pH-values below 7. Oxidation is terminated on reaching a pH-value below 4 and is followed by the treatment described above to prevent sintering.

Carbonates or hydroxides may be used as alkalis. It is preferred to use sodium hydroxide.

Where phosphorus is used as stabiliser, it is preferably added to the solution containing iron and, optionally, zinc sulphate, together with the alkalis by dissolving $NaH_2PO_4.2H_2O$ in a small quantity of the solvent.

The precipitated iron(II) is oxidised by passing through from 2 to 8 liters of air per hour per liter of precipitation solution with intensive stirring.

Oxidation is preferably carried out at temperatures of from 40° to 80° C. until the suspension is yellow-brown in colour. Instead of air, oxygen-enriched air may also be used for oxidation.

The precipitation of iron phosphate on to the surface of the suspended particles to protect them against sintering is obtained by the slow addition of phosphate, preferably pyrophosphate, dissolved in a little distilled water.

The modified α-FeOOH obtained is filtered off, washed free from sulphate, dried at temperatures slightly above 100° C., dehydrated at temperatures of from 250° to 400° C. and tempered at temperatures of from 400° to 900° C.

This temperature treatment preferably extends over a period of from 0.5 to 2 hours at temperatures of from 650° to 850° C.

The precursor compound thus obtained is reduced into $Fe_3O_4$ in the usual way at 400° to 500° C. in moist hydrogen, for example in a fluidised bed.

An iron oxide powder which has a packing density of at least 35% and an $M_R/M_S$-ratio of at least 0.88 for a coercivity of 20 to 28 KA/m is used in the lower layer.

Oxides which satisfy these requirements are described for example in German Pat. No. 2,347,486.

The outer layer has a dry thickness of up to 3 μm, whilst the lower layer may have a dry thickness of from 3 to 10 μm. However, it is preferred to use an upper layer having a thickness of 2 μm and a lower layer having a thickness of 4 μm.

The advantage of the multilayer magnetic recording material according to the invention lies in the fact that, in spite of the play back equalization of 120 μs prescribed for the iron oxide standard, the bias noise levels obtained with the double-layer tape are as favourable as those obtained with tapes which, according to the standardisation, are operated with a play back equalisation of 70 μs. The bias noise level is lower by about 3 dB in relation to the standardised low-noise standard. At the same time, the double-layer tape has a high sensitivity in lower frequency ranges, a compatible frequency response and a better maximum output at the short wavelengths than single-layer tapes of the iron oxide type.

The magnetic recording material according to the invention is produced in the usual way by applying the pigmented binder dispersions successively or simultaneously to a flexible support with magnetic orientation of the acicular, magnetic pigment. The layers are then dried at temperatures of preferably from 80° to 100° C. and supercalendered to obtain the necessary surface smoothness.

Suitable flexible support layers are the support layers known per se, such as for example polyethylene terephthalate and -2,6-naphthalate, polyolefins such as polypropylene, polycarbonate and cellulose derivatives such as cellulose triacetate, in thicknesses of up to 200 μm.

The ferrimagnetic pigments, binders, solvents and other additives which may be used, such as dispersants, lubricants, delustrants and antistatic agents, are mixed and ground. The ferrimagnetic powder may be dispersed with the solvent and with part of the binder and then subjected to the main grinding operation together with the rest of the other components.

Ball mills, sand mills, stirrer mills and the like may be used for grinding.

The dispersions may be applied to the support layer by screen printing, knife coating, air-brush coating, extrusion coating, as described for example, in German Pat. No. 1,907,213, of by dip coating. The layers may be applied one after the other with intermediate drying and also wet-on-wet using multiple-slot coating units. During coating (before the dispersion hardens), the magnetic pigments are oriented longitudinally by a magnetic field having a strength of from 600 to 1400 Gauss. As a result, the remanence values are greater in the preferential direction than transverse thereof. The orientation in the outer and lower layers may also run in different directions (longitudinal and transverse), as described in German Auslegeschrift No. 1,190,985.

For consolidation and for obtaining a high surface smoothness, the layers are passed between metal rollers, which are heated and polished, and between cotton- or plastics-coated rollers. The pressure amounts to between 50 and 300 kg/cm and the surface temperature of the metal rollers to between 50° and 100° C.

Suitable binders are thermoplastic, elastic polymers known per se which may be used either individually or in admixture. The binder is generally used in a quantity of from 0.2 to 0.4 parts by weight and, more particularly, in a quantity of from 0.25 to 0.3 parts by weight per 1 part by weight of magnetic powder. Suitable binders are, for example, copolymers of vinyl chloride/vinylacetate, vinylidene chloride/acrylonitrile, (meth)acrylate/styrene, butadiene/acrylonitrile, polyvinyl acetals, such as vinyl formal or vinyl butyral, partially hydrolysed polyvinyl chloride/polyvinylacetate, polyamides, cellulose derivatives, epoxy resin, polyurethane elastromers, particularly reaction products of polyesters of adipic acid, butane diol and diphenyl methyl isocyanate, isocyanate prepolymers and melamine resin.

Typical additives which are mixed with the dispersions are higher fatty acids and fatty acid esters, lecithin, waxes, silicone oils and surfactants, such as quaternary ammonium salts.

Organic solvents suitably used for preparing the pigments dispersions include acetone, methylethyl ketone, alcohols such as methanol, ethanol, butanol, esters such as methylacetate, butylacetate, chlorinated hydrocarbons such as methylene chloride, and tetrahydrofuran.

The electroacoustic data of the comparison tapes and the tapes according to the invention were measured in a tape recorder having a tape speed of 4.75 cm/s.

| Recording track width: | 0.6 mm |
|---|---|
| Gap width of the magnetic heads: | 2.0 μ |
| Play back equalization: | 120 μ |
| Reference level: | 250 nWb/m |

The noise voltage was determined with an effective-value meter using the NAB-A-evaluation curve according to DIN 45 505.

Since the tape recorders fluctuate in their bias currents, the tape data were measured at various settings as follows:

| BC bias current 1: output ratio $MOL_3$-$MOL_{10max}$ = | 7 dB |
|---|---|
| BC bias current 2: output ratio $MOL_3$-$MOL_{10max}$ = | 12 dB |
| BC bias current 3: output ratio $MOL_3$-$MOL_{10max}$ = | 18 dB | in each case using the non recorded section of the DIN reference tape according to DIN 45 513/Part 6.

Further measuring data on which test results are based are set out and defined in the following Table:

| Reference level: | The output voltage $U_B$ standardized to 0 dB which is obtained on playing back the level section of the DIN reference tape with a flux of 250 nWb/m (corresponding to an output voltage of 1 V). |
|---|---|
| Maximum output level at long wave-lengths ($MOL_3$): | Output voltage $U_{V3}$ of the test specimen with 3% cubic distortion at reference frequency (333 Hz), referred to the voltage $U_B$. $MOL/dB = 20 \log \frac{U_3}{U_B}$ |
| Maximum output level at short wave-lengths ($MOL_{10max}$): | The maximum output voltage $U_{10max}$ of the test specimen at 10 Hz, referred to reference level: $MOL_{10max} = 20 \log \frac{U_{10max}}{U_B}$ |
| Bias noise level (BN): | Output voltage $U_G$ of the machine-erased and magnetically biassed tape, measured as RMS-value and weighted by an NAB-A-filter, referred to reference level: $BN = 20 \log \frac{U_G}{U_B}$ |
| Signal to noise ratio (dynamic range): (S/N): | Difference between $MOL_3$ and BN, i.e. the measurable range between tape noise on the one hand and non-disturbing distortion on the other hand. |

The multilayer recording material according to the invention is illustrated by the following Examples, comparison tests, Tables and drawings.

| Comparison Example A Single-layer tape containing $\gamma$-$Fe_2O_3$ Composition: | Parts by weight |
|---|---|
| Magnetic pigment (in powder form) having a coercivity of 25,1 KA/m | 6.80 |
| $M_R/M_S$-ratio on the tape | 0.89 |
| Packing density | 39% p.V. |
| Polyether urethane, reaction product of polytetramethylene glycol, 1,4-butane diol and diphenyl methane diisocyanate | 0.74 |
| OH-groups-containing copolymer of vinyl chloride/vinyl acetate | 0.80 |
| Organic phosphoric acid ester | 0.11 |
| Tetrahydrofuran | 8.5 |
| 1,2-dichloroethane | 4.5 |
| Hexakis-methoxy-melamine | 0.07 |
| Dodecyl-benzene sulphonic acid | 0.10 |

The individual components were mixed, ground in a sand mill filled with glass beads (1 to 2 mm in diameter) and filtered.

The dispersion thus obtained was applied to a polyethylene terephthalate film in a thickness of 12 μm by means of an extrusion hopper unit, dried and calendered. The dry layer thickness amounted to 6 μm. The tape was then cut to a width of 3,81 mm and wound into a compact cassette.

Tape A has the following magnetic and electroacoustic characteristics:

| Coercivity: | 24,4 KA/m |
|---|---|
| Remanence: | 0.16 T |

| | BC1 | BC2 | BC3 |
|---|---|---|---|
| $MOL_3$/dB: | +1.1 | +2.2 | +5.1 |
| $MOL_{10max}$/dB: | −6.0 | −9.4 | −15.2 |
| S/N/dB: | 51.8 | 53.6 | 55.8 |

| Comparison Example B | Parts by weight |
|---|---|
| Single-layer tape containing $CrO_2$ Composition: | |
| Magnetic pigment (in powder form) having a coercivity of 40 KA/m (manufacturer: Dupont) | 5.50 |
| Polyester urethane, reaction product of a polyester of adipic acid, butane diol with diphenyl diisocyanate | 0.79 |
| Hydroxyl-groups-containing vinyl chloride/vinyl acetate copolymer | 0.39 |
| Fatty acid ester | 0.05 |

| -continued | |
|---|---|
| Lecithin | 0.17 |
| Tetrahydrofuran | 6.90 |
| Cyclohexanone | 2.45 |

Processing is carried out in the same way as in Example A. The tape has the following magnetic and electroacoustic characteristics:

| Coercivity: | | 39 KA/m | |
|---|---|---|---|
| Remanence: | | 0.16 T | |
| BN | | −51.0 dB | |
| | BC1 | BC2 | BC3 |
| MOL$_3$/dB: | −10.5 | −6.4 | −2.0 |
| MOL$_{10max}$/dB: | −2.3 | −2.7 | −4.5 |
| S/N/dB: | 40.5 | 44.6 | 49.0 |

Comparison Example C

Single-layer tape containing magnetite

A tape was produced in accordance with Example B using a magnetite according to German Patent application P 28 01 395.8. The results of the measurements are as follows:

| Coercivity: (powder) | 31,8 KA/m |
|---|---|
| M$_R$/M$_S$-ratio on the tape: | 0.79 |
| Packing density: | 33% p.V. |
| Remanence: | 0.12 T |
| BN: | −54.7 dB |

| | BC1 | BC2 | BC3 |
|---|---|---|---|
| MOL$_3$/dB: | −5.0 | −1.7 | +2.3 |
| MOL$_{10max}$/dB: | −3.5 | −5.2 | −9.6 |
| BN/dB: | 49.7 | 53.0 | 57.0 |

COMPARISON EXAMPLE D

Double-layer tape containing CrO$_2$/Fe$_2$O$_3$

The lower layer (U) was produced in accordance with Example A with a layer thickness of 4 μm, whilst the upper layer (O) was produced in accordance with Example B with a layer thickness of 2 μm.

The double-layer tape showed the following characteristics:

| Coercivity (O): | | 39 KA/m | |
|---|---|---|---|
| (U): | | 24,4 KA/m | |
| Remanence (O): | | 0.16 T | |
| (U): | | 0.16 T | |
| BN: | | −50.6 dB | |
| | BC1 | BC2 | BC3 |
| MOL$_3$/dB: | −4.6 | ±0 | +3.8 |
| MOL$_{10max}$/dB: | −2.3 | −2.9 | −6.0 |
| S/N/dB: | 45.6 | 50.2 | 54.0 |

COMPARISON EXAMPLE E

A commercially available double-layer tape (total thickness 5 μm), which contains iron oxides as magnetic pigments in the upper layer and lower layer, has the following characteristics:

| BN | | −48.7 dB | |
|---|---|---|---|
| | BC1 | BC2 | BC3 |
| MOL$_3$/dB: | +1.9 | +3.8 | +4.3 |
| MOL$_{10max}$/dB: | −2.9 | −6.0 | −14.4 |
| S/N/dB: | 50.3 | 52.5 | 53.0 |

EXAMPLE 1

To produce the double-layer tape according to the invention, a lower layer is prepared in accordance with Example A and an upper layer in accordance with Example C. The upper layer (O) has a dry thickness of 2 μm and the lower layer (U) a dry thickness of 4 μm. Measurement results:

| Coercivity (O): | | 30,5 KA/m | |
|---|---|---|---|
| (U): | | 24.3 KA/m | |
| Remanence (O): | | 0.12 T | |
| (U): | | 0.16 T | |
| BN: | | −53.8 dB | |
| | BC1 | BC2 | BC3 |
| MOL$_3$/dB: | +0.4 | +2.7 | +4.6 |
| MOL$_{10max}$/dB: | −4.4 | −6.0 | −11.1 |
| S/N/dB: | 53.2 | 56.5 | 57.4 |

FIG. 1 at the end of the description additionally shows the dependence of the electroacoustic properties upon the relation of the respective layer thicknesses of the double-layer tape according to the invention for the three bias currents (BC1, BC2, BC3), the individual layers having the same composition as in Example 1.

The abscissa shows the uniform total layer thickness using an opposite sequence of numbers for the upper layer (O) and lower layer (U). The ordinate shows the output or output voltage (U$_A$) for MOL$_3$ and MOL$_{1-0max}$ and the dB-scales based on the reference level. The continuous line represents the maximum output at the long wave-lengths (MOL$_3$) whilst the interrupted line represents the maximum output at the short wave-lengths (MOL$_{10max}$). It can be seen from the graph that, for the optimum layer structure of the double-layer tape according to the invention in regard to MOL$_3$ and MOL$_{10max}$, the layer thickness of the upper and lower layer should amount to 2 μm and 4 μm, respectively. Accordingly, a layer thickness ratio such as this was also adopted for the following Examples.

EXAMPLE 2

The layer structure corresponds to Example 1, except that a magnetite is used which has a coercivity (powder) of 33,8 KA/m, an M$_R$/M$_S$-ratio of from 0.79 and a packing density of 32% p. Vol.

| Measurement results | | | |
|---|---|---|---|
| Coercivity (O): | | 33,1 KA/m | |
| (U): | | 24,3 KA/m | |
| Remanence (O): | | 0.12 T | |
| (U): | | 0.16 T | |
| BN: | | −53.8 dB | |
| | BC1 | BC2 | BC3 |
| MOL$_3$/dB: | ±0 | +2.3 | +4.6 |
| MOL$_{10max}$/dB: | −3.1 | −5.2 | −10.0 |
| S/N/dB: | 53.8 | 56.1 | 58.4 |

EXAMPLE 3

The lower layer of the double-layer tape has the same structure as in Comparison Example A with a dry layer thickness of 4 μm. The following recipe was adopted for the magnetite-containing upper layer:

| Composition: | Parts by weight |
|---|---|
| Magnetite (powder) having a coercivity of 32 KA/m | 5.0 |
| $M_R/M_S$-ratio | 0.79 |
| packing density | 33% p.V. |
| Hydroxyl-groups-containing vinyl chloride/vinyl acetate copolymer | 1.77 |
| Organic phosphoric acid ester | 0.25 |
| Isocyanate prepolymer based on tolylene diisocyanate (NCO-content 3.2%, molecular weight approximately 2000) | 0.4 |
| Mixture of ethylacetate and butylacetate | 17.0 |

As in the other Examples, the upper layer produced in accordance with this recipe also had a thickness of 2 μm.

| Measurement results: | | | |
|---|---|---|---|
| Coercivity (O): | 30,8 KA/m | | |
| (U): | 24,1 KA/m | | |
| Remenance (O): | 0.12 T | | |
| (U): | 0.16 T | | |
| BN: | −54.2 dB | | |
| | BC1 | BC2 | BC3 |
| $MOL_3$/dB: | ±0.3 | +2.3 | +4.6 |
| $MOL_{10max}$/dB: | −3.7 | −5.5 | −10.5 |
| S/N/dB: | 54.5 | 56.8 | 58.8 |

In FIG. 2, the electroacoustic characteristics of a double layer tape according to the invention produced in accordance with Example 1 are compared with the characteristics of single-layer tapes according to Examples A (with $\gamma$-Fe$_2$O$_3$) and C (with magnetite). The abscissa shows the magnetite bias current, whilst the ordinate shows the output voltage ($U_A$) and the corresponding scale in dB-values. The continuous lines apply to the double-layer tape, the interrupted line to the individual layer containing Fe$_2$O$_3$ and the dotted line to the individual layer containing magnetite. The total layer thickness amounts to 6 μm in each case. The curves and the measurement results show the advantage of the double-layer tapes according to the invention at all bias settings. They show substantially the quality of conventional single-layer iron oxide tapes in regard to maximum output $MOL_3$, but an improvement of up to 4 dB in maximum output $MOL_{10max}$.

The sensitivity of a double-layer tape according to the invention to high and low frequencies is compatible with conventional iron-oxide single-layer tapes, so that a linear frequency response can be obtained. In comparison with the unrecorded section of the DIN reference tape, batch No. T 308 (deposited at the physikalisch-technische Bundesanstalt) the frequency response is higher by only 0.5 and 2.5 dB, so that the sound impression is not impaired.

To sum up, the particular advantage of the invention may be assessed as follows:

Compared with conventional double-layer tapes, irrespective of whether they contain CrO$_2$ or $\gamma$-Fe$_2$O$_3$ in the upper layer, a lower bias noise level and hence a higher dynamic range are obtained despite a playback equalization of 120 μs. The result is not limited to tape recorders having a tape speed of 4.75 cm/s, but also applies to recorders having higher tape speeds.

What is claimed is:

1. In a magnetic tape recording material for tape recorders operable with the iron oxide bias and a playback equalization of 120 μs having improved stability, a support and, arranged one above the other thereon, at least two layers containing magnetic pigments and synthetic resin binders and differing in coercivity and layer thickness, characterised in that the uppermost layer contains as acicular, magnetic pigment magnetite thermally stabilized with one or more elements comprised of an effective amount of P (expressed as P$_2$O$_5$) or B (expressed as B$_2$O$_3$) together with a metal selected from the group consisting of Cd, Pb, Ca, Mg, Zn, Al, Cr, W, said stabilizing element or elements being present in an amount of from 0.1 to 5% by weight based on Fe$_3$O$_4$, and having an average crystallite size, as determined by X-ray photography, of from 30 to 35 nm and a coercivity of from 28 to 36 KA/m, said magnetite having a bias noise level, based on the reference level, which is lower by about 3 dB in relation to the standardized low-noise standard.

2. A magnetic recording material as claimed in claim 1, characterised in that the magnetite contains from 0.3 to 3% by weight zinc and from 0.3 to 3% by weight of P (expressed as P$_2$O$_5$), based on Fe$_3$O$_4$.

3. A magnetic recording material as claimed in claim 1, characterised in that the lower layer contains an acicular iron oxide which has a packing density of $\geq$35%, an $M_R/M_S$-ratio of at least 0.88 and a coercivity of 20 to 28 KA/m.

4. A magnetic recording material as claimed in claim 1, characterised in that the upper layer has a dry layer thickness of 2 μm and the lower layer a dry layer thickness of 4 μm.

5. A magnetic recording material as claimed in claim 1, characterised in that the multilayer tape has a dynamic range of $\geq$53 dB.

* * * * *